Figure 1:
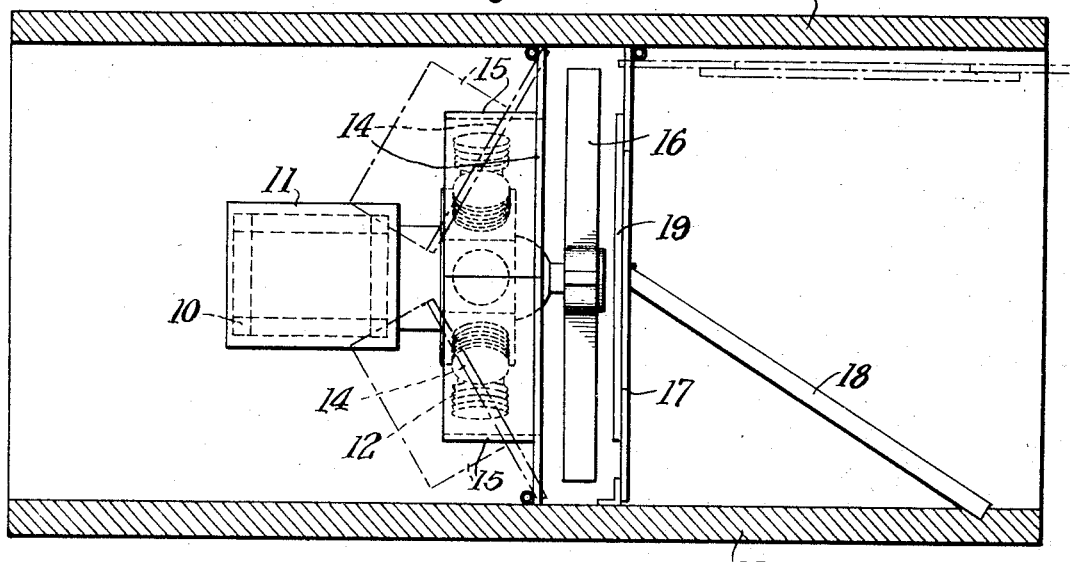

May 12, 1931.                E. A. RYDER ET AL                1,804,646
ENGINE TESTING APPARATUS
Filed March 13, 1929

Alexander H. King
Earle A. Ryder
INVENTORS
BY
Mitchell & Bechert
ATTORNEYS

Patented May 12, 1931

1,804,646

UNITED STATES PATENT OFFICE

EARLE A. RYDER AND ALEXANDER H. KING, OF WEST HARTFORD, CONNECTICUT, ASSIGNORS TO THE PRATT & WHITNEY AIRCRAFT CO., OF HARTFORD, CONNECTICUT, A CORPORATION OF DELAWARE

ENGINE TESTING APPARATUS

Application filed March 13, 1929. Serial No. 346,778.

This invention relates to engine testing apparatus, and particularly to apparatus for testing an air-cooled engine.

An object of the present invention is to provide a testing apparatus which will enable an engine to be tested under operating conditions and maintained properly cooled by means of an induced draft of fresh air passing the engine cylinders.

A further object of the invention is to provide testing apparatus which will facilitate the positioning of the engine for operating tests and which will enable the engine to be tested under actual working or loaded conditions.

A further object of the invention is to closely surround the periphery of the engine with a flanged member so that a propeller mounted on and rotated by the engine will induce a strong flow of air in stream lines through a passage through the flanged member and past the engine cylinders.

A further object of the invention is to provide a retractable flange member permitting the flange member to be moved aside for admitting and removing an engine with its propeller mounted thereon.

A further object of the invention is to provide a baffle plate directly in front of the propeller and of sufficient diameter to cause a radial discharge of air from the tips of the propeller vanes.

A still further object of the invention is to provide air circulating means past the cylinders of an air-cooled engine so designed that the air will first pass the cylinders substantially in parallel stream lines and then will be thrown radially by the propeller or fan attached to the engine shaft, this movement of the air being sufficient to absorb the power of the engine.

With these and other objects in view our invention includes the features of construction and operation set forth in the following specification and illustrated in the accompanying drawings.

In the accompanying drawings annexed hereto and forming a part of this specification we have shown our invention embodied in a test apparatus for an air-cooled engine of the radial type, but it will be understood that the invention can be otherwise embodied, and that the drawings is not to be construed as defining or limiting the scope of the invention, the claims appended to this specification being relied upon for that purpose.

In the drawings—

Figure 2:
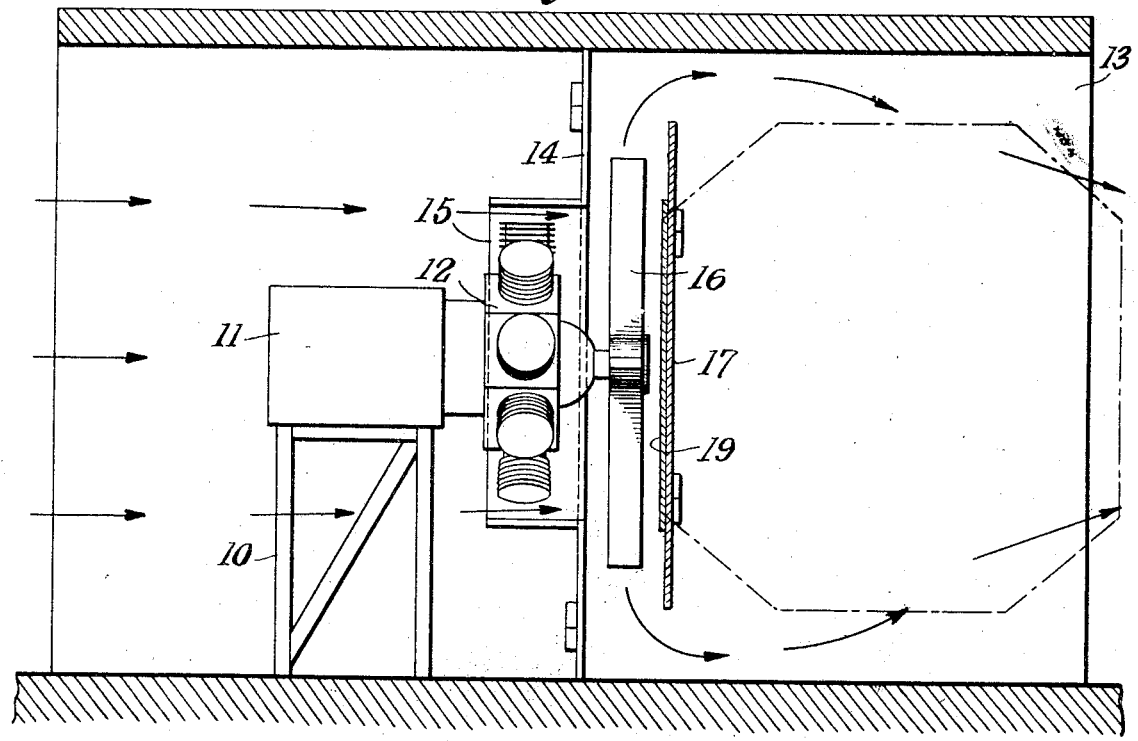

Fig. 1 shows a plan view of the apparatus with an engine mounted in position for testing; and Fig. 2 is a view in elevation of the testing apparatus.

In the above mentioned drawing we have shown but one embodiment of the invention which is now deemed preferable, but it is to be understood that changes and modifications may be made within the scope of the appended claims without departing from the spirit of the invention.

In the art of testing air-cooled engines which are not in themselves provided with blowers it is necessary to provide a suitable blast of air past the cylinders to effect cooling of the cylinders. This blast of air may be furnished by a mechanical or other form of blower driven from a separate source of power or a special blower or propeller driven by the engine being tested. In testing large engines economy of both power and apparatus indicates the use of the power of the engine to produce the necessary blast.

The means used at present is to mount the engine on a torque stand or movable support so that its torque reaction can be measured, and attach a propeller or fan of suitable size to the engine shaft to absorb the engine power and blow a current of air onto the engine cylinders.

The above mentioned method has limitations and defects as the air blast produced by the propeller mounted on the engine shaft does not travel in paths parallel to the engine shaft but is given a whirling or rotary movement. The air therefore strikes the engine cylinders at an oblique angle and causes a false indication of the torque reaction of the engine support. Also, even with the test room open to the outside air considerable recirculation of heated air is caused by the propeller so that the engine is less effectively cooled than it would be if all air passing the cylinders were perfectly fresh air. Also, propellers small enough in diameter so that the blast of air produced thereby is driven onto the engine cylinders and steep enough in pitch to absorb the power of the engine, are inefficient. An engine having a relatively slow speed driving shaft as, for instance, one with a speed reduction gear interposed between the engine shaft and propeller shaft requires such a large propeller that the air blast produced passes outside the diameter of the engine cylinders and therefore does not effect cooling action. It is well known that the extreme tips of the propeller blades are the most effective portions.

The present invention provides an improved air circulating or cooling system designed to overcome the above named defects and limitations and which will enable the engine to be tested under working conditions.

Referring more in detail to the figures of the drawings we provide a room shown in section in the drawings and having a table or other form of stand 10 therein. Upon this table or stand 10 is adapted to be mounted a supporting member 11 for the engine 12 to be tested. This stand 10 and support 11 for the engine 12 may be of any well known type, such as a torque stand enabling the torque developed by the propeller to be measured by suitable means. The engine 12 is mounted upon one end of the supporting member substantially centrally of the test room.

Mounted within the room and preferably hinged to the side walls 13 thereof are cooperating doors 14, to each of which is attached a semicircular flange member 15 at the meeting edges of the doors 14. When the doors 14 are closed the flange members 15 form a closely surrounding and enclosing cylindrical sleeve or opening for the cylinders of the engine 12. This form of opening induces the circulating air to flow past the engine cylinders substantially in parallel stream lines. Within the flange members 15 the door members 14 are cut away so that there is a central cylindrical and tubular opening through the doors. With the doors 14 open as shown in dotted lines in Fig. 1, an engine may be conveniently moved into the test room and mounted upon the stand 10 after which the doors 14 can be closed to enclose the engine within the semicircular flange members 15.

Mounted on the engine 12 is a propeller or club 16 having radial arms to force air striking them in directions outwardly and radially of the engine and to absorb the power developed by the engine 12. The effect of this rotation of the propeller or club 16 is to induce a strong current of fresh air past the cylinders of the engine 12 in substantially parallel or stream lines. This air has to pass through the flange members 15 so that operating conditions of the engine 12 under test will closely simulate conditions of the engine in use. The cylinders of the engine 12 will be maintained properly cooled by this current of air in a similar manner as when the engine 12 is being used under operating or normal conditions.

Directly in front of the propeller or club 16 is another door or member 17 which may be hinged as shown and supported conveniently by one or more laterally extending props 18 as shown. This hinged member 17 has a baffle plate 19 disposed concentrically with the engine 12 and having a diameter substantially equal or approximately equal to the diameter of the propeller or club 16. The air striking the vanes or arms of the propeller 16 is forced radially outwardly beyond the tips of the vanes and past the periphery of the baffle plate 19. The resistance of and therefore the power absorbed by the propeller or club 16 is enhanced by the air striking the inner ends of the vanes of the propeller 16 in stream lines and being forced radially outward by the vanes. The propeller 16 is of greater diameter than the opening in the flange members 15 through which the air passes to the propeller 16 past the engine 12 so that the air is necessarily forced radially outward by the propeller vanes past the periphery of the baffle plate 19.

The ends of the room are left open as shown in the figures so that air is drawn in at one end and forced outwardly at the other end, thus providing an ample source of fresh and cool air to be circulated about the engine 12 and preventing the re-circulation of heated air.

We claim:

1. An air dynamometer comprising a propeller secured to an engine being tested, a cylindrical casing surrounding the engine, a baffle in front of said propeller, whereby air will be drawn past said engine and thrown radially by said impeller past said baffle.

2. An air dynamometer comprising a propeller secured to an engine being tested, a cylindrical casing having movable sections movable to open and closed positions, and a movable baffle in front of said propeller, whereby an engine may be mounted in position for testing with the movable members in open position, and the engine tested after the members have been closed.

3. An air dynamometer comprising a room open at opposite ends, a support for the engine to be tested, a transverse partition within said room having a cylindrical tubular opening therethrough adapted to accommodate the cylinders of the engine being tested, and whereby air will be drawn through said opening to effectively cool the cylinders of said engine.

4. An air dynamometer comprising a room open at opposite ends, a support for the engine to be tested, a transverse partition within said room having a cylindrical tubular opening therethrough adapted to accommodate the cylinders of the engine being tested, a baffle within said room and spaced from said partition, whereby air will be drawn through said opening to effectively cool the cylinders and forced past said baffle to absorb the power of said engine.

5. An air dynamometer comprising a propeller secured to an engine being tested, a casing surrounding the engine, and a torque stand for said engine, said casing serving to lead air substantially in stream lines through said casing and past the cylinders of said engine.

6. An engine testing dynamometer comprising a torque measuring support for the engine to be tested, a test propeller mounted on and driven by said engine, and means for inducing air to first pass said engine substantially in stream lines for displacement by said propeller to absorb the power of the engine.

7. In apparatus of the class described, a support for an engine to be tested, a propeller mounted on said engine, and a casing surrounding said engine and adapted to induce a circulation of air past said engine, said casing being retractable to give access to the engine.

8. A testing apparatus for engines comprising a room open at opposite ends, a propeller mounted on and driven by the engine being tested, and a transverse wall having an opening provided therein within which said engine is adapted to fit, said transverse wall directing air past said engine substantially in stream lines and preventing recirculation of air past said engine.

9. A testing apparatus for engines comprising in combination, a closure member having a flange member thereon surrounding said engine, a propeller on said engine on one side of said closure member, and a baffle directly in front of said propeller, whereby air will first be drawn past said engine through said closure member and then thrown radially outwardly beyond said baffle by said propeller.

10. A testing apparatus for engines comprising in combination, a pair of closure members having semicircular flange members thereon adapted in closed position to surround said engine, a propeller on said engine on one side of said closure members when in their closed positions, and a baffle directly in front of said propeller, whereby air will first be drawn past said engine and then thrown radially by said propeller past said baffle.

11. A testing apparatus for engines comprising in combination, a closure member having a circular flange thereon adapted to surround said engine, a propeller on said engine at one side of said closure member and circular flange, and a baffle directly in front of and closely adjacent said propeller, whereby air will first be drawn through said circular flange past said engine and then thrown radially by said propeller past said baffle.

12. A testing apparatus for engines comprising in combination, closure members having semicircular flange members thereon adapted when said closure members are in operative position to surround and enclose the periphery of said engine, a propeller on said engine on one side of said closure members, and a baffle directly in front of said propeller, whereby air will first be drawn through said flange members and past said engine by said propeller and then thrown radially past said baffle.

13. A testing apparatus for engines comprising in combination, a room open at opposite ends, a stand within said room on which an engine to be tested may be mounted, closure members hinged to the side walls of said room and having flange members thereon adapted to surround and enclose the periphery of said engine, a propeller on said engine upon one side of said closure members, and a baffle directly in front of said propeller, whereby air will be drawn through said flange members past said engine by said propeller and then thrown radially past said baffle.

14. A testing apparatus for engine comprising in combination, a stand on which an engine to be tested may be mounted, a closure member surrounding said engine and having a flange member thereon to force air therethrough past the cylinders of the engine being tested, a propeller on said engine of greater diameter than the opening in said closure member, and a baffle directly in front of said propeller and having a diameter substantially equal to said propeller, whereby air will be drawn past said engine and then thrown radially outward by said propeller past said baffle.

EARLE A. RYDER.
ALEXANDER H. KING.